United States Patent [19]

Sandor

[11] Patent Number: 5,715,877
[45] Date of Patent: Feb. 10, 1998

[54] SOLUTION DILUTION ASSEMBLY

[75] Inventor: Joseph Sandor, Balboa Island, Calif.

[73] Assignee: Champion Chemical Co. of Calif., Inc., Whittier, Calif.

[21] Appl. No.: 725,330

[22] Filed: Oct. 1, 1996

[51] Int. Cl.$^6$ .................................................. B65B 1/04
[52] U.S. Cl. .................... 141/307; 141/302; 141/351; 141/360; 222/548
[58] Field of Search .......................... 141/59, 290, 291, 141/292, 295, 301, 302, 305, 307, 351, 360, 362, 364, 366, 375, 379; 222/548, 482, 484; 137/588; 251/127; 215/309; 220/253, 374

[56] References Cited

U.S. PATENT DOCUMENTS

| | | | |
|---|---|---|---|
| 3,384,276 | 5/1968 | Henningfield | 222/484 |
| 5,323,832 | 6/1994 | Burrows | 222/484 |
| 5,628,352 | 5/1997 | Gracyalny et al. | 141/291 |

*Primary Examiner*—Henry J. Recla
*Assistant Examiner*—Steven O. Douglas
*Attorney, Agent, or Firm*—Edgar W. Averill, Jr.

[57] ABSTRACT

An assembly for dispensing a constant flow of liquid from a bottle independent of the level of liquid in the bottle. The assembly has a two-part cap with an inner portion and an outer portion. The inner portion is affixed to the bottle and has a generally cylindrical air chamber which extends into the liquid in the bottle. This inner cap member has an opening in the bottom. An outer cap member has a mating air chamber and a mating opening in the bottom. When the outer cap member is turned with respect to the inner cap member to a closed position, no liquid can pass through the misaligned openings. There are also a set of alignable air openings in the air chambers of the inner and outer cap members which permit air to exit from the air chamber into the liquid when the liquid outlet openings are aligned. The result is a constant flow rate out of the bottle no matter what the height of liquid in the bottle may be until the bottle is essentially empty.

9 Claims, 10 Drawing Sheets

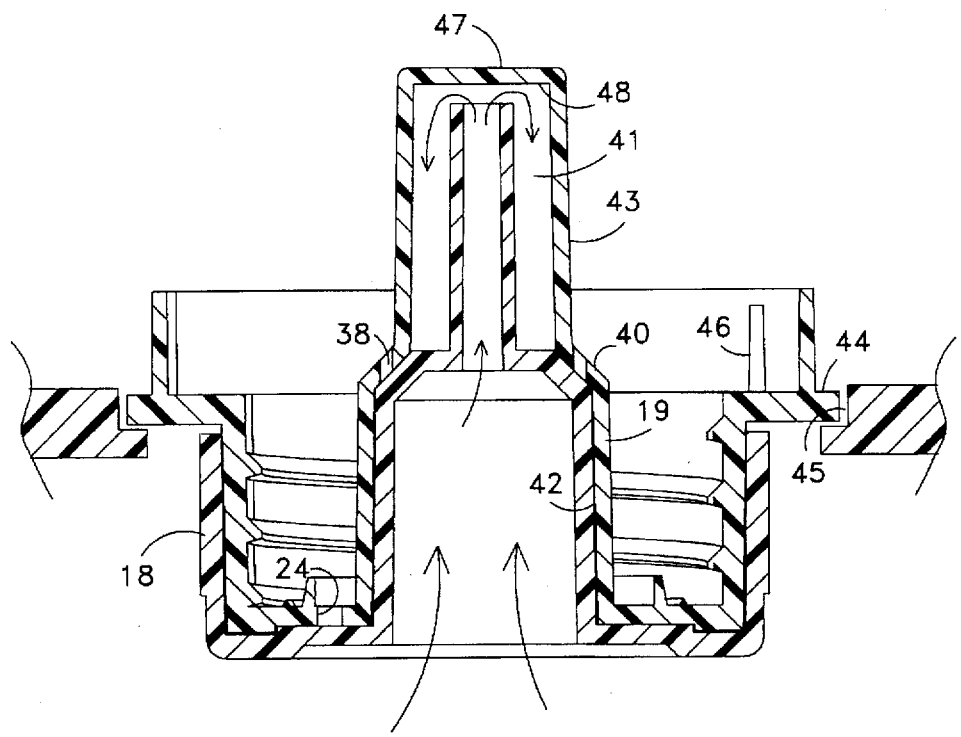
FIG.3.
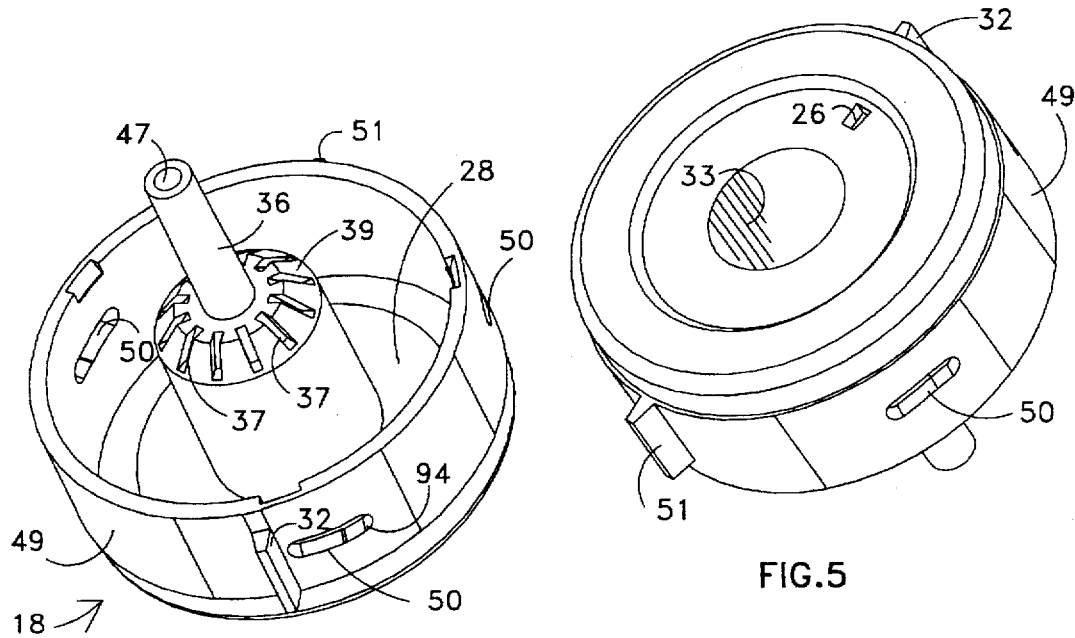
FIG.4.
FIG.5

SOLUTION DILUTION ASSEMBLY

BACKGROUND OF THE INVENTION

The field of the invention is concentrated liquid dilution and the invention relates more particularly to the dilution of solutions with water, particularly useful for preparing cleaning solutions.

Most cleaning solutions are either sold in a ready to use diluted solution or must be manually diluted by the end user. For those solutions which are provided in a ready to use dilution a substantial amount of space and weight is required because of the water shipped with the ready to use solution. When a concentrated solution is shipped the end user must be relied upon to dilute the solution and a substantial amount of waste results in the misdilution of cleaning chemicals and other solutions. An apparatus to accurately dilute solutions has been devised and is shown in U.S. Pat. No. 5,425,404. This device utilizes the bottle cap as a cam to push open a water valve while at the same time opening the cap to the flow of concentrated solution to be mixed with the water. One of the requirements of such a device is that the flow of concentrated solution be relatively constant independent of the height of solution in the bottle. This is accomplished by a device shown in U.S. Pat. No. 4,570,830 which is designed for the dilution of beverages from a concentrate. This device utilizes a two-part cap where the outer portion turns and moves upwardly or downwardly with respect to the inner portion. A tube is closed at its upper end when the cap is in a closed position to help prevent liquid from escaping out of the central bore. The device has a number of separate parts and is prone to liquid exiting the central bore.

BRIEF SUMMARY OF THE INVENTION

It is an object of the present invention to provide a device for causing a constant flow of liquid from a bottle independent of the liquid level in the bottle.

It is another object of the present invention to provide an assembly for diluting a concentrated liquid with water which assembly is capable of providing different concentrations of dilutions depending upon the cap used with the bottle.

The present invention is for an assembly for dispensing a constant flow of liquid from a container independent of the level of liquid in the container. The assembly has an inner cap member which is screwed on or otherwise affixed to the neck of the container. The inner cap member has a bottom floor with a liquid passageway passing through it. The inner cap member has a portion which extends upwardly into the liquid in the container and provides an air chamber which is closed at the top. This air chamber has openings through the side wall thereof. An outer cap member has a portion which surrounds the inner cap member and has a bottom which abuts the bottom of the inner cap member. It also has an opening in the bottom which may be aligned with the opening in the inner cap member to permit the flow of liquid out of the two portions of the cap. The outer cap member also has a central air chamber which fits within the central air chamber of the inner cap member and has a plurality of slots which permit air to pass from the air chamber into the liquid when the inner and outer cap members are turned in a position where liquid can flow out of the container. When the two cap portions are turned to a closed position the air passageway between the liquid and the air chamber is closed and the liquid passageway between the two cap members is also closed, so that the bottle of concentrated solution may be stored, shipped or otherwise moved without any spillage of any liquid. Only after the passageway in the two cap portions have been aligned is it conceivable that any liquid can enter into the air chamber and at that point air enters the air chamber. Preferably the air passageway on the outer cap is a groove along its outer surface and preferably there are a plurality of such grooves. The inner cap member is secured to the container in such a way that it does not turn during use of the dispenser and only the outer cap member moves between the closed position and an open position.

The present invention is also for a liquid dilution assembly for diluting a concentrated solution with a diluent utilizing a container of concentrated solution which is capable of flowing into the assembly at a constant rate of flow. A two-part cap is affixed to the container and the inner portion of the cap is affixed in a way that it will not turn with respect to the container. The inner portion of the cap is shaped to mate with a receptacle on the housing of the dilution assembly so that neither it nor the bottle will turn when the device is being used. A dilution activation member is held by the housing and moveable between at least one open position and at least one closed position. The dilution activation member mates with the outer cap member and causes it to turn from a closed position to an open position when the dilution activation member is moved. Preferably it has a handle extending outwardly from the housing. The dilution activation member also has an arm which depresses a water valve. Thus, when the dilution activation member is moved from a closed position to an open position the outer cap is turned to initiate a constant flow of concentrated solution and a water valve is open to initiate a flow of diluent and the two portions are mixed within the housing to provide an accurately diluted solution. Preferably there are two different valves within the housing, each providing a different rate of flow so that the housing may be used to quickly fill a large container or a small container. The caps are configured in such a way so that the dilution activation member can only move in one direction when a first flow of water is desired and only in a second direction when a second flow rate of water is desired.

BRIEF DESCRIPTION OF THE DRAWINGS

FIG. 3 is a cross-sectional view of the two-part system of the assembly for dispensing a constant flow of liquid of FIG. 1 shown in a closed configuration.

FIG. 4 is a perspective view showing the inner surface and a portion of the side surface of the outer cap member of the assembly of FIG. 1.

FIG. 5 is a perspective view showing the bottom and a portion of the side of outer cap of the assembly of FIG. 1.

DESCRIPTION OF THE PREFERRED EMBODIMENTS

Figure 1:
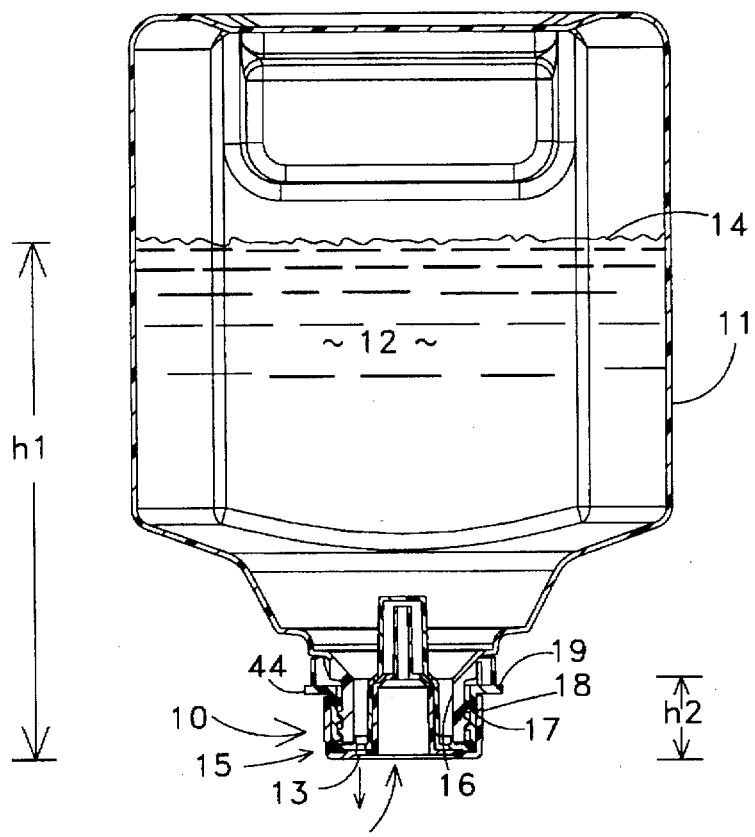
FIG. 1 is a cross-sectional view of the assembly for dispensing a constant flow of liquid of the present invention.

The assembly for dispensing a constant flow of liquid from a container is shown in cross-sectional view in FIG. 1 and includes a constant flow assembly 10 and a container 11. Container 11 contains a concentrated solution 12 and can be any solution which is used in a diluted state. While the constant flow device of the present invention will be discussed herein largely in the context of diluting a cleaning solution, it can, of course, be used to dilute other concentrates such as beverage concentrates.

The liquid outlet is indicated by reference character 13 and the height of the liquid from the top of the liquid level 14 to the outlet 13 is indicated in FIG. 1 by reference character "h1". If container 11 simply had an opening in the bottom the liquid would flow out faster when h1 is larger and slower when h1 is less. In order to overcome this non-constant flow rate, the L7 assembly indicated generally by reference character 15 is provided. This assembly, as is more thoroughly described below, keeps a constant rate of flow equal to reference character "h2", also shown in FIG. 1. It can be visualized that as the liquid flows out of container 11 at a constant driving force or head of h2, the flow rate will be constant until the bottle is essentially empty. In this way all one needs to do is provide a constant flow diluent (typically water) to provide a constant dilution without the need to measure either the concentrated solution 12 or the diluent.

Container 11 has a neck 16 with threads 17 although, of course, other types of attachment means can be used. The assembly 15 basically has an outer cap member 18 and an inner cap member 19. The terms "outer" and "inner" are quite arbitrary as it depends on what portion of the cap one views, but the terms apply to the lowermost portions shown in FIG. 1 and are consistently used herein.

Figure 2:
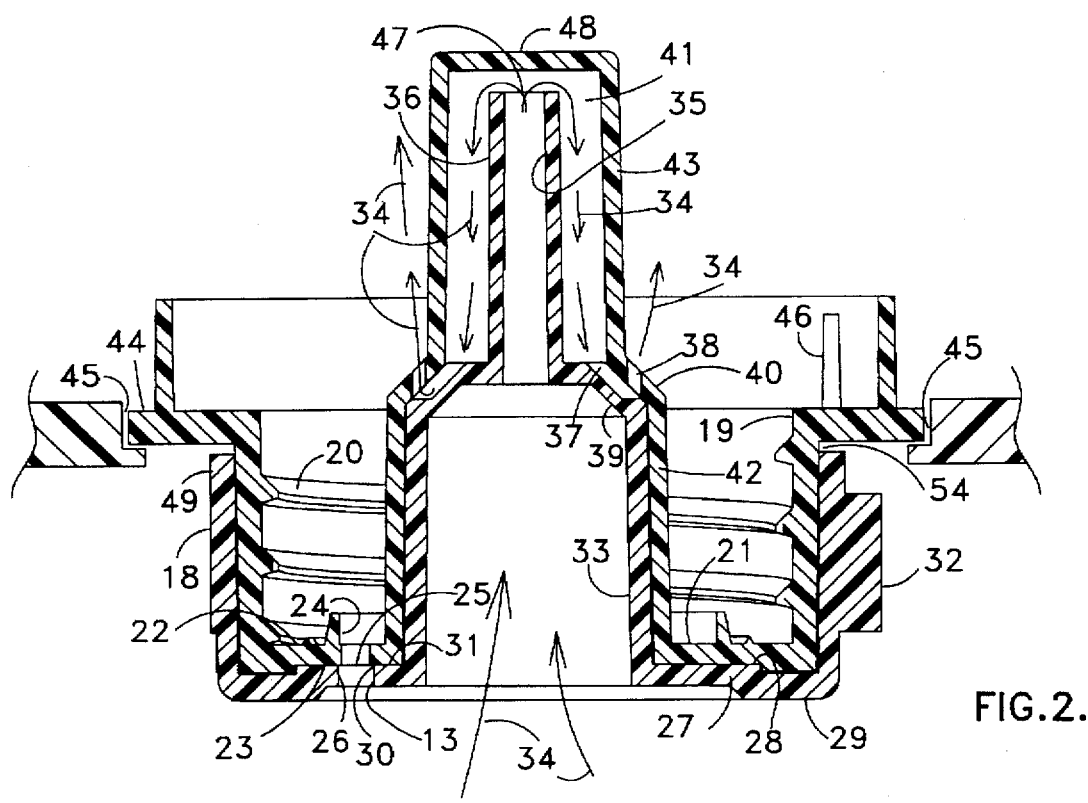
FIG. 2 is a cross-sectional view of the two-part system of the assembly for dispensing a constant flow of liquid of FIG. 1 shown in an open configuration.

Turning now to the details of construction of the cap assembly, the inner and outer members are shown in cross-sectional view in FIG. 2. It can be seen that inner cap member 19 has a plurality of threads which mate with threads 17 on neck 16 of container 11. Inner member 19 has a bottom floor 21 which has an upper surface 22 and a lower surface 23. Bottom floor 21 has at least one liquid passageway 24. Passageway 24 has a liquid outlet sealing means 25 surrounding its outlet. As shown in FIG. 2, the two parts of the cap are turned so that passageway 24 is aligned with at least one opening 26 in the bottom floor 27 of outer cap member 18. Bottom floor 27 has an inner surface 28 and an outer surface 29. Inner surface 28 abuts lower surface 23 of the bottom floor 21 of the inner cap member. The inlet 30 of opening 26 is surrounded by a flat surface which provides an inlet sealing means 31 when the passageway 24 and the opening 26 are not aligned. The outer cap member 18 is provided with two tabs (32, 51) which will be described below but briefly permit the user to turn the outer cap member a small amount with respect to the inner cap member to move it from an open position of FIG. 2 to the closed position of FIG. 3.

The air flow which replaces any liquid which passes out of outlet 13 enters the central portion of outer cap member 18 and passes into a central air passageway 33. It then passes as shown by arrows 34 into the central opening 35 of tube 36. It then passes downwardly through a series of grooves 37 which function with sidewall openings 38 to provide an air valve. As shown best in FIG. 4, the frusto conical portion 39 of central air passageway 33 mates with the frusto conical portion 40 of the air passageway portion of the inner cap member described below. As shown in FIG. 3 when the outer cap member 18 is turned with respect to inner cap member 19, grooves 37 no longer are aligned with sidewall openings 38, thus, the air chamber 41 formed around tube 36 is closed to the flow of liquid concentrate 12. Furthermore, the passageway 24 is no longer aligned with the opening 26 and thus, concentrated solution cannot escape and air cannot enter, providing a safe, closed container.

The inner cap member 19 also has an inner wall portion 42 which closely surrounds and is supported by the central air passageway 33 of the outer cap member. This inner wall portion 42 extends to the frusto conical portion 40 with its sidewall openings 38 to the generally cylindrical chamber walls 43 which surround air chamber 41. The inner cap member 19 has an outer flange 44 which mates with a recess 45 formed in the housing shown in FIG. 16. In this way, the inner cap member does not turn with respect to recess 45 and it is also prevented from turning with respect to container 11 by a plurality of teeth 46 which mate with tabs on the outer surface of the neck of container 11 not shown. The result is, the device is used with the container and the inner cap member fixed with respect to the housing.

As outer cap member turns with respect to inner cap member 19, there is essentially no vertical movement between the outer and inner cap members except for a very slight tightening movement. Thus, the upper end 47 of tube 36 never touches the closed top 48 of the air chamber 41.

The details of construction of the outer cap member 18 are shown best in FIGS. 4 through 9. There it can be seen that the outer cap member has a generally cylindrical wall 49 with three slots 50 passing therethrough. The tube 36 has an open upper end 47 and the frusto conical portion 39 can be seen to have 12 grooves 37. It can also be seen that a pair of tabs 32 and 51 extend outwardly from wall 49.

Figure 6:
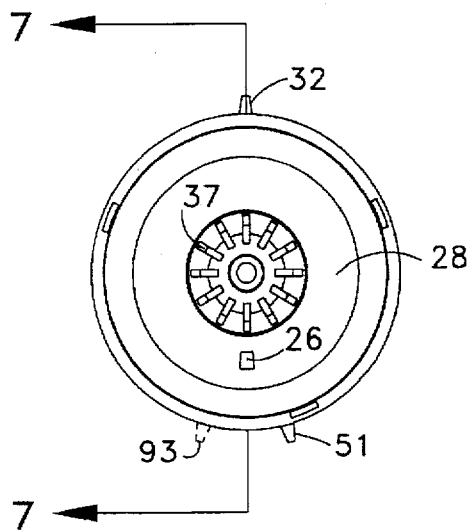
FIG. 6 is a top view of the outer cap of FIG. 4.
Figure 7:
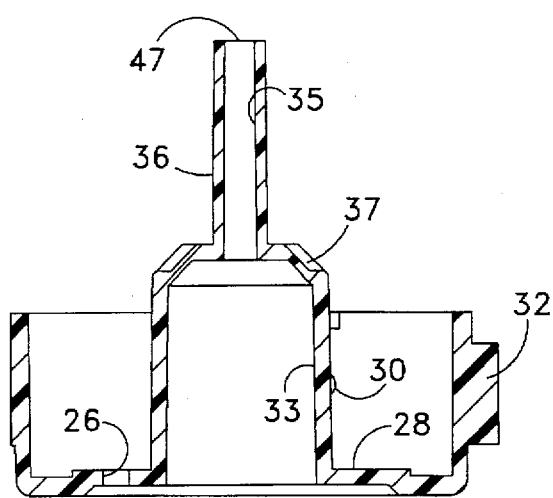
FIG. 7 is a cross-sectional view taken along line 7—7 of FIG. 6.
Figure 8:
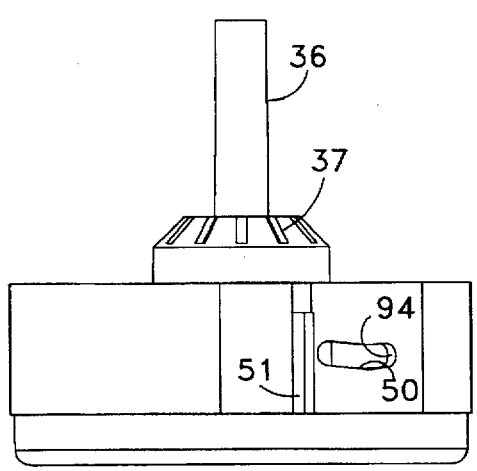
FIG. 8 is a side view of the outer cap of FIG. 4.
Figure 9:
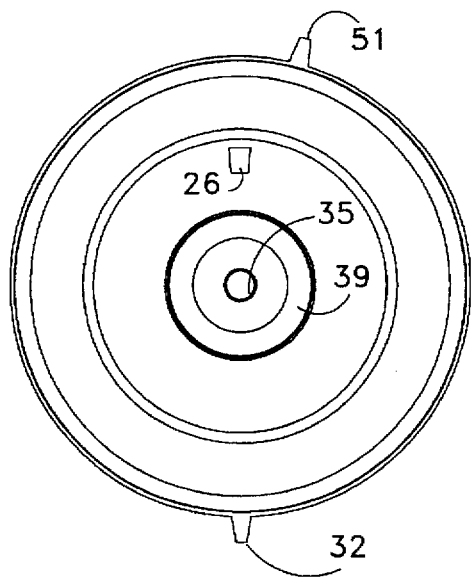
FIG. 9 is a bottom view of the outer cap of FIG. 4.
Figure 10:
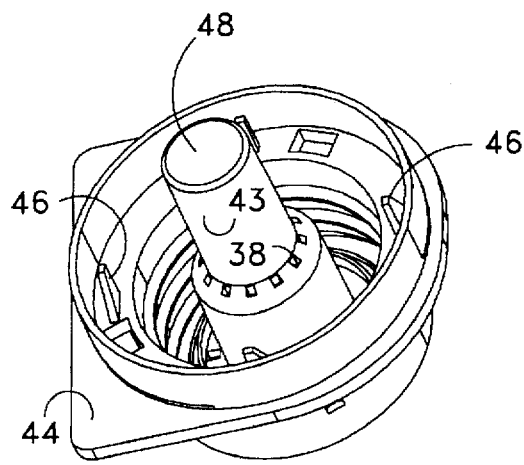
FIG. 10 is a perspective view showing the inner surface and a portion of the side of the inner cap portion of the assembly of FIG. 1.
Figure 11:
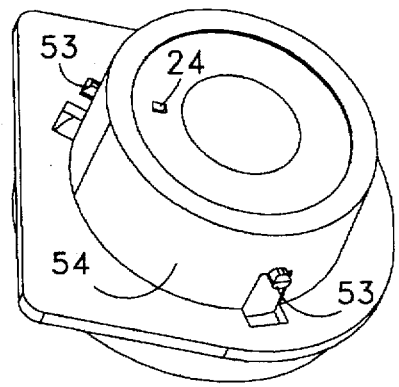
FIG. 11 is a perspective view showing the bottom and a portion of the side of the inner cap member of FIG. 10.
Figure 12:
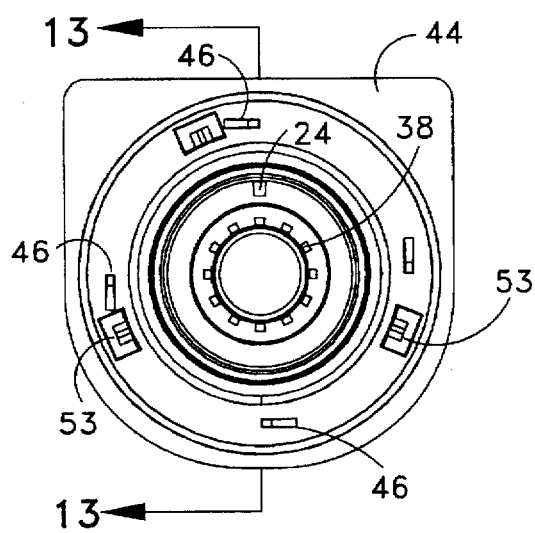
FIG. 12 is a top view of the inner cap member of FIG. 10.
Figure 13:
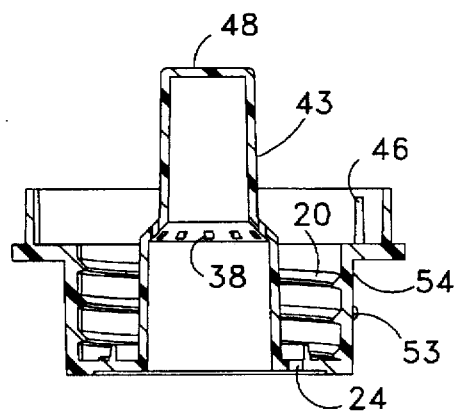
FIG. 13 is a cross-sectional view taken along line 13—13 of FIG. 12.
Figure 14:
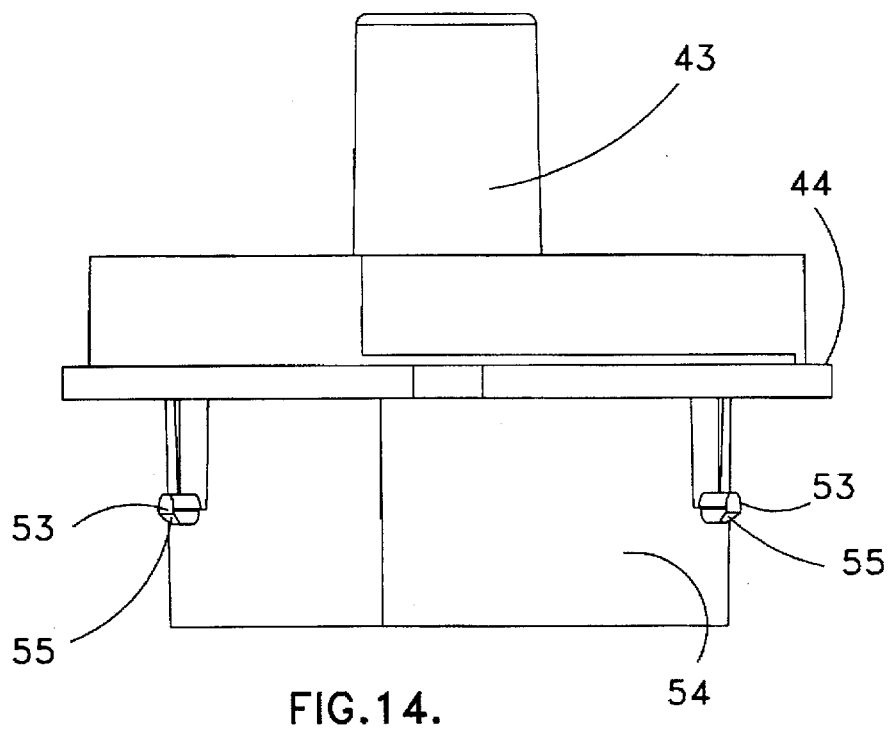
FIG. 14 is a side view of the inner cap member of FIG. 10.
Figure 15:
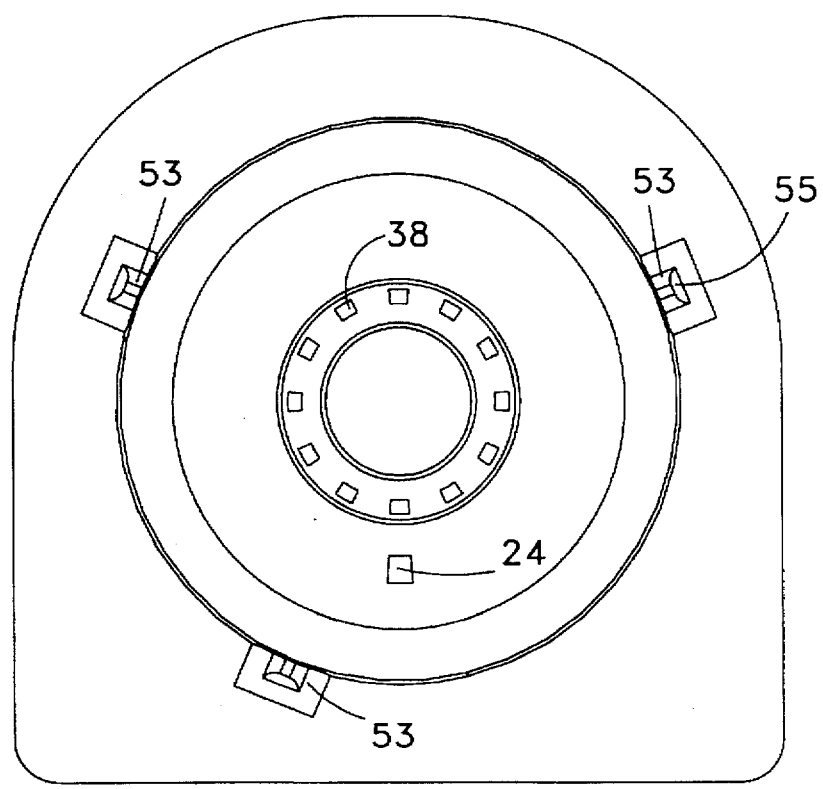
FIG. 15 is a bottom view of the inner cap member of FIG. 10.

The bottom of outer cap member 18 is shown in perspective view in FIG. 5 where it can be seen that opening 26 is rectangular in shape which permits the opening and closing of the two parts of the cap with a minimum of turning. The smooth inner surface 28 is shown in FIG. 6 and this provides a sealing means when the matching surface of the inner cap member is turned against smooth surface 28.

Figure 16:
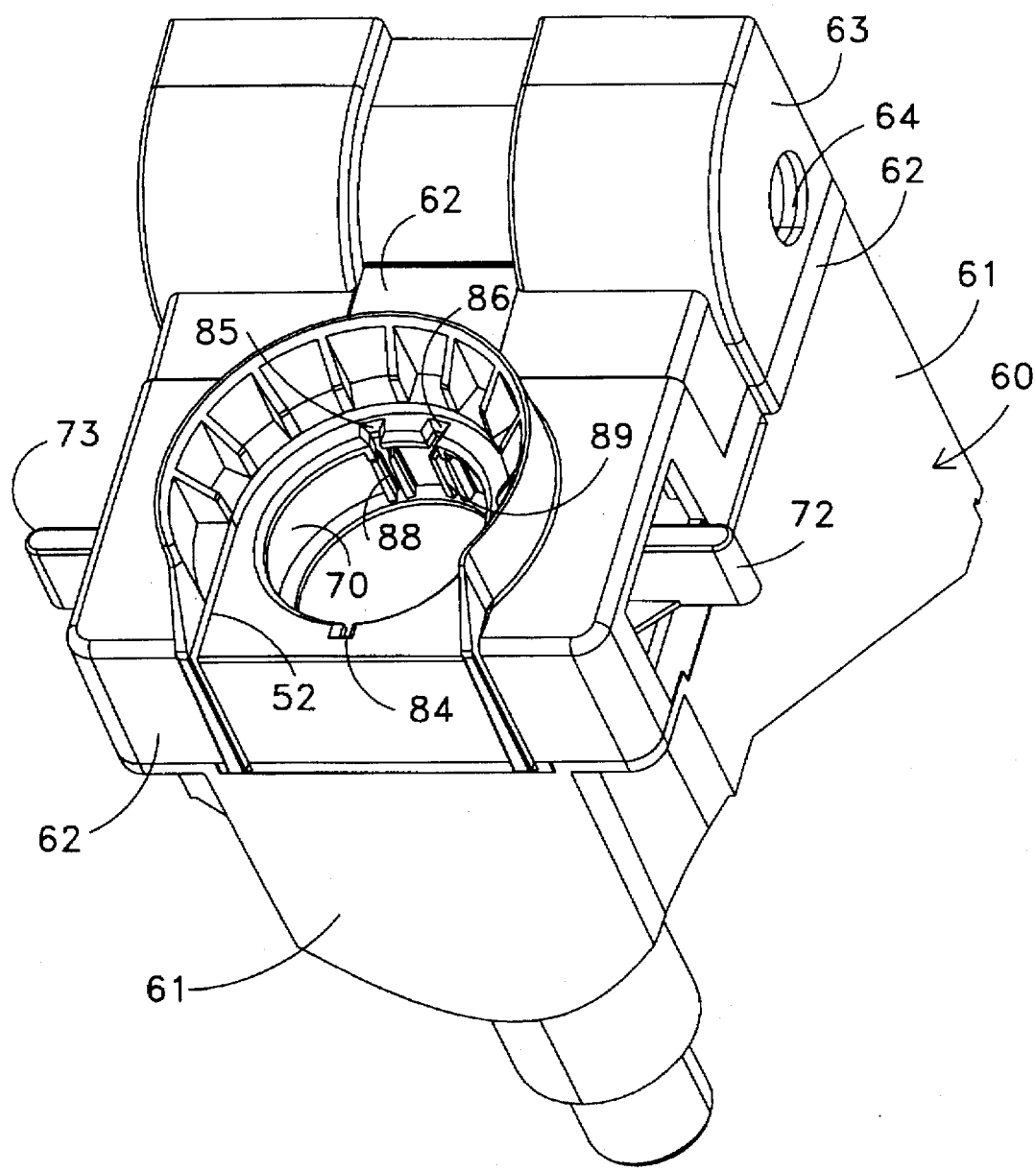
FIG. 16 is a perspective view showing the top right side and front of the housing of the liquid dilution assembly of the present invention.

The details of construction of the inner cap member 19 are shown best in FIGS. 10 through 15 where it can be seen that outer flange 44 is irregular in shape so that when it is placed in an irregular opening, such as that shown in the housing in FIG. 16 and indicated by reference character 52, it will not turn.

The inner cap is held to the outer cap by the snapping of three pins 53 formed on the wall 54 of the inner cap into the three slots 50 formed in the wall 49 of outer cap 18. As seen best in FIG. 8, these slots 50 are very slightly angled so that as the cap is closed the outer cap and inner cap are pressed slightly more tightly together. The movement of the inner and outer cap, however, is basically a rotational movement and not an in and out movement, the amount of in and out movement being insubstantial except for a slight tightening effect. As shown best in FIG. 14, the pins 53 have a slight angled face 55 to assist in pushing the inner cap 19 into the outer cap 18. The amount of rotation between the two caps is only about 20° since the rotation is limited by the length of slot 50. The assembled then may be threaded onto the neck 16 of container 11 when it is ready to use in housing 60.

Housing 60 as shown in FIG. 16 has three major pieces, namely, a funnel support piece 61, a control support piece 62 and a valve support piece 63. Control support piece 62 holds the regular opening 52 and is the portion which supports the bottle and cap assembly of FIG. 1 in a fixed position.

Figure 17:
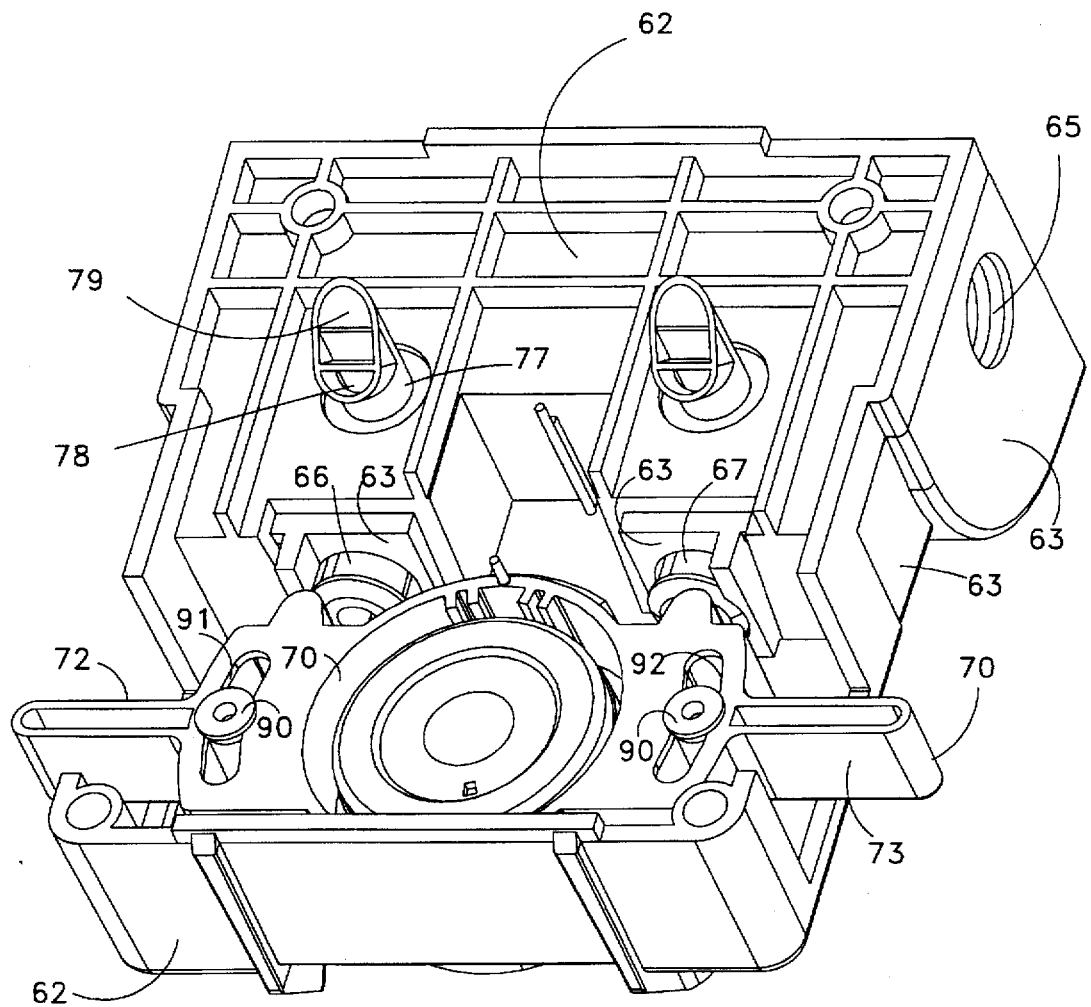
FIG. 17 is a perspective view showing the underside of the central portion of the liquid dilution assembly of FIG. 16.

Valve support piece 63 has an inlet 64 for the attachment of a source of water under pressure such as tap water. Inlet 64 is preferably a threaded inlet and a threaded inlet 65 shown in FIG. 17 is positioned on the opposite side so that water may be piped in from either side with the other side being plugged. Valve support piece 63 is preferably fabricated from glass reinforced nylon so that it can withstand the line water pressure. As shown in FIG. 17, valve support piece 63 holds two different valves 66 and 67. These valves are operated by depressing push buttons 68 and 69 by movement of dilution activation member 70.

Figure 19:
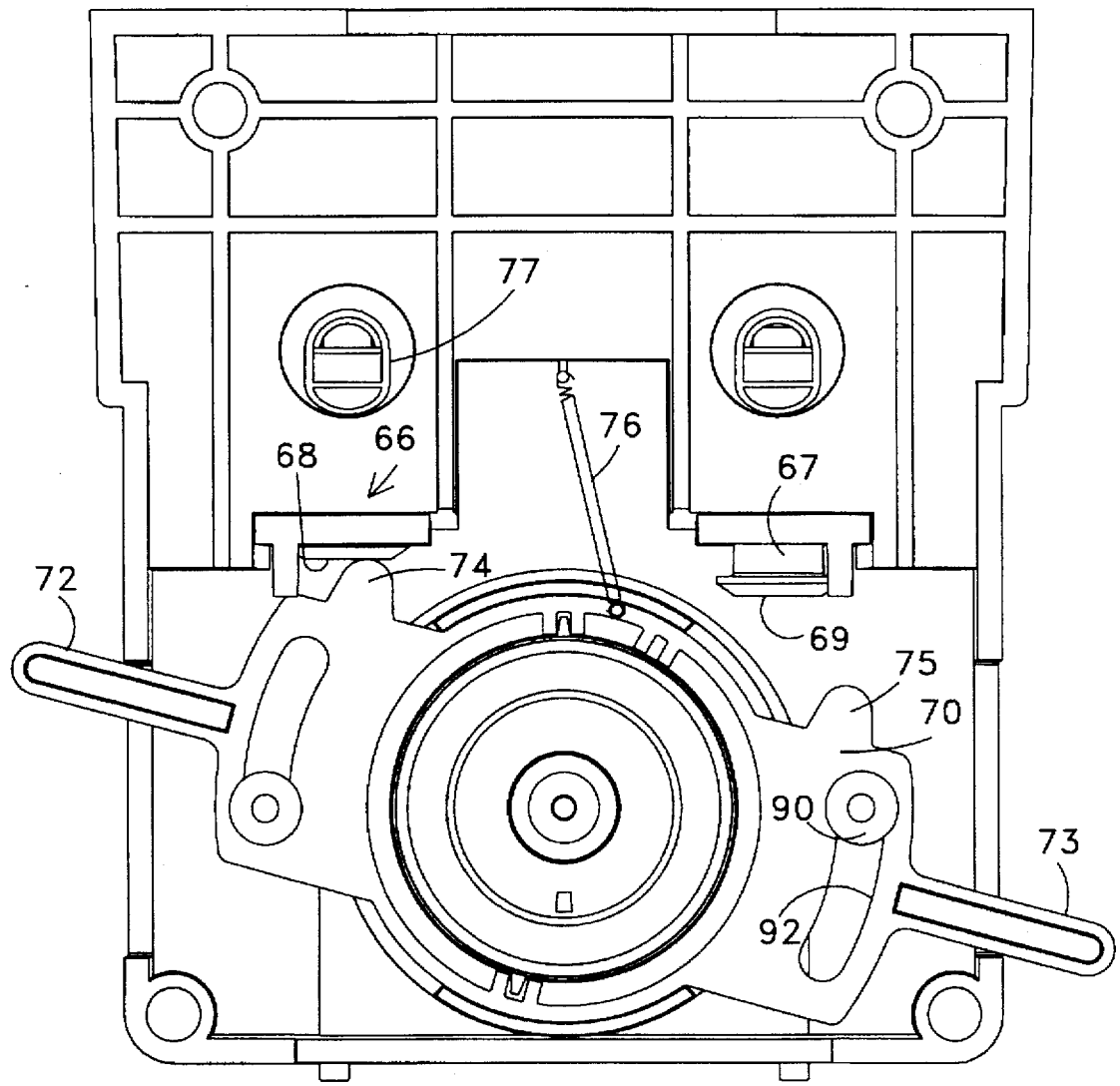
FIG. 19 is a bottom view of the middle portion of the housing of FIG. 16 with the dilution activation member in an open configuration.
Figure 20:
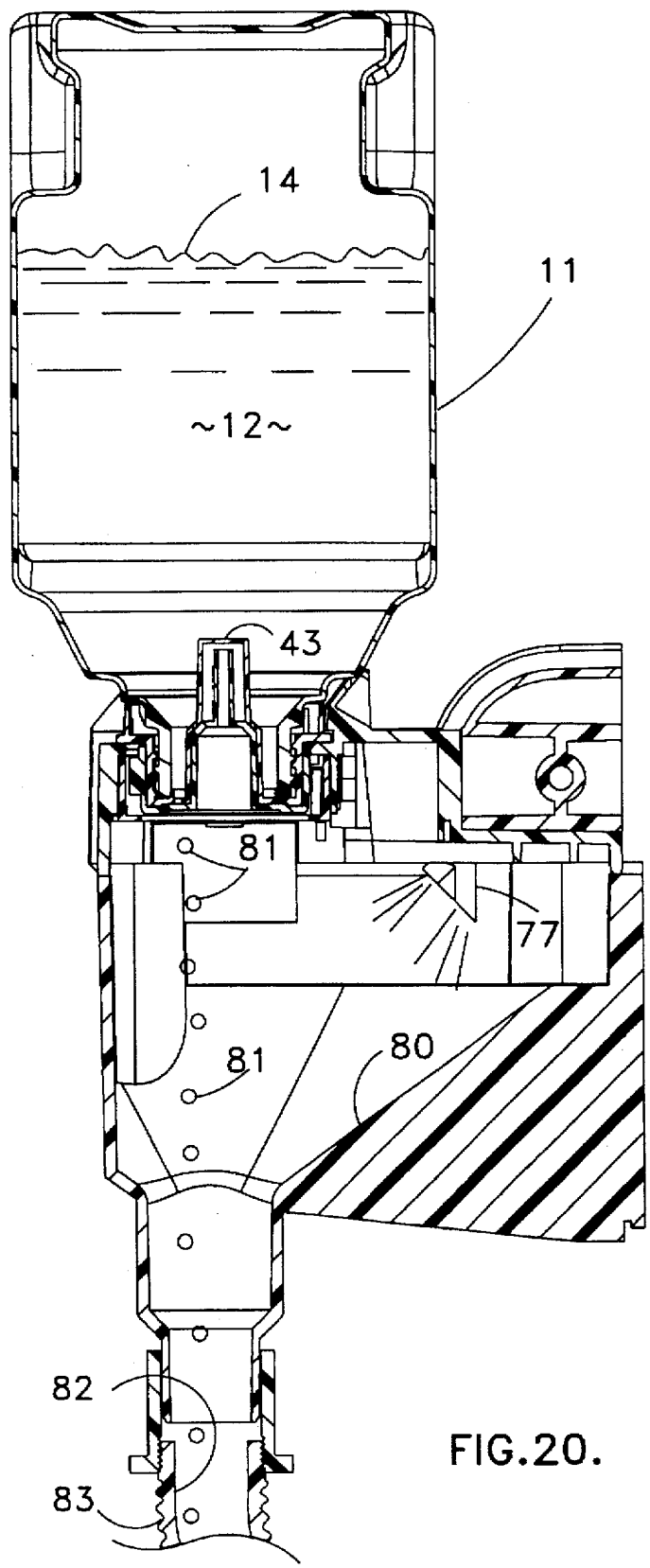
FIG. 20 is a cross-sectional view of the liquid dilution assembly of FIG. 16.

Dilution activation member 70 is held in an opening 71 of the control support piece 62 so that it may be rocked between the position shown in FIG. 19 to a central position such as shown in FIG. 17 and in a position not shown being the opposite of FIG. 19. Dilution activation member has a pair of handles 72 and 73 which move protrusions 74 and 75 into contact with push buttons 68 and 69 respectively. Thus, as handle 72 is moved rearwardly, protrusion 74 abuts push button 68 and depresses the push button to the position shown in FIG. 19 which turns on valve 66. A spring 76 urges the dilution activation member 70 back to a central position as shown in FIG. 17. Furthermore, the push button 68 is spring loaded and also urges the valve 66 into a closed position. As valve 66 is opened, water is emitted from nozzle 77. As shown best in FIG. 17 nozzle 77 has a pair of openings 78 and 79 which cause the water to be sprayed in two separate streams which assist the mixing operation. These streams strike the side of funnel 80 and cause a swirling action. The drips 81 of the concentrated solution 12 preferably do not land on the funnel surface as contact with a sprayed stream of water could cause foaming with some detergents. Instead, the drops 81 do not contact the water until it leaves the funnel area shown in FIG. 6. The mixing preferably takes place in a flexible tube 83 where foaming is minimized. The result is a flow of mixed solution 82 which is preferably fed from a flexible hose 83 into a bucket, spray bottle or other appropriate container for the properly diluted solution.

The interaction between the two-part cap 18 and 19 and the dilution activation member 70 is as follows: It can be seen in FIG. 16 that three notches comprising a centered notch 84, a left notch 85 and a right notch 86 are formed in control support piece 62. By viewing the cap from the top as the bottle is inverted as shown in FIG. 1, it can be seen that tab 32 fits into centered notch 84 and tab 51 fits into left notch 85. These notches 84, 85 and 86 are aligned with corresponding notches 87, 88 and 89 in dilution activation member 70. Dilution activation member 70 is held in control support piece 62 by screws 90 over slots 91 and 92 in dilution activation member 70.

Figure 18:
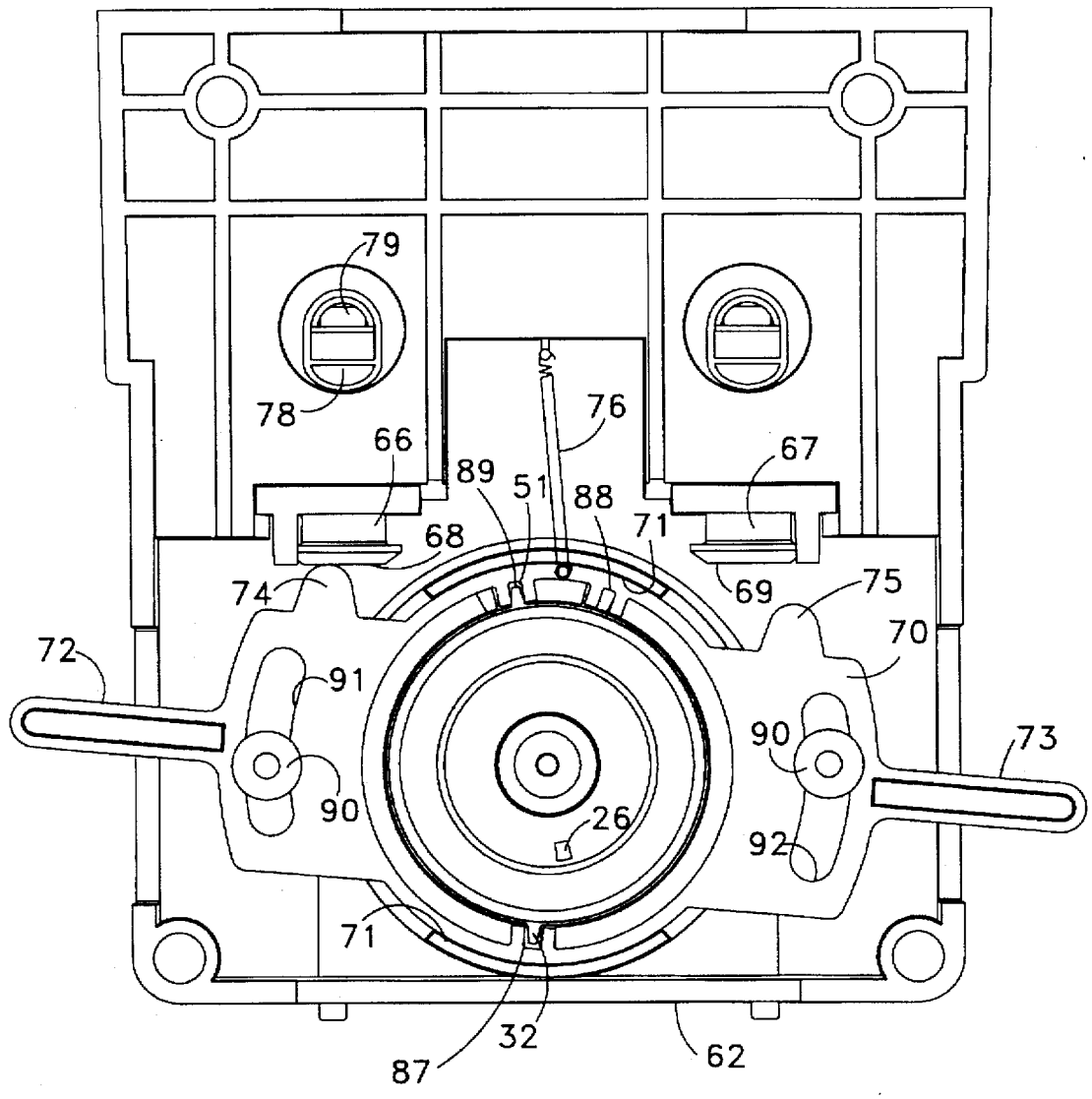
FIG. 18 is a bottom view of the middle portion of FIG. 17 showing the dilution activation member in a closed but locked position.

Returning to FIG. 16 it can be readily understood that as the tabs 32 and 51 enter notches 84 and 85 respectively, they pass into notches 87 and 88 respectively. Thus, as handle 72 is pressed rearwardly as viewed in FIG. 16, the outer cap 18 will be slightly turned with respect to inner cap 19. The slots 50 move so that the pins 53 are guided along the slots and the opening 26 moves so that it is aligned with the liquid passageway 24 as shown in FIG. 2 of the drawings. This permits the flow of concentrated fluid out through these openings into funnel 80 while at the same time valve 66 is open causing water to be sprayed out of nozzle 77 to mix with the concentrated solution 12 as described above. Once sufficient solution has been delivered, handle 72 is released which, by the action of the spring in valve 66 and spring 76, returns to the position shown in FIG. 18. In this position the bottle is closed but it is still held in housing 80 because the notches 89 and 87 are not aligned with notches 84 and 85. Only when the dilution activation member is centered as shown in FIG. 17 can the cap be withdrawn from the housing 60.

Thus, if the user for instance wishes to use multiple amounts of a floor cleaner, the concentrated floor cleaner solution may be left in housing 60 and used many times.

Preferably valves 66 and 67 provide different flow rates of water. The outer cap can be configured with tabs in two different positions. A phantom tab 93 is shown in FIG. 6 to indicate the position of an outer cap which would intersect notch 85 and 88. When outer cap 18 is in a fully closed position, the pins 53 abut the closed end 94 of slots 50 so that the cap cannot be moved in a further closed direction but can only be moved in an open direction. Thus, if one were to place cap 18 into housing 60 and attempt to push handle 73, the handle would not move because the outer cap 18 could not move in that direction. Thus, the user would be forced to use handle 72 and in this way the outer cap can be designed to provide a different flow rate. For instance, if valve 66 provided a flow rate of 1 gallon per minute and valve 67 provided a flow rate of 3 gallons per minute, the outer cap with the tab in the position of tab 51 could only provide a flow rate of 1 gallon per minute and an outer cap with a tab positioned in the position of tab 93 could only provide a flow rate of 3 gallons per minute. The caps would, of course, be used with different solutions depending upon which flow rate is preferred. Furthermore, the liquid passageway 24 in the inner cap can be provided in many different sizes depending upon the viscosity and dilution desired. That is, the smaller that opening 24 is made the slower the flow rate of concentrated solution 12 will be through it. Conversely, the larger the opening 24 is made, the greater the flow rate through it. It is preferred that opening 26 be as large as the largest opening 24 so that the flow rate is guided by the side of opening 24 and not by the size of opening 26. It is contemplated that six different versions of inner cap will be made to provide the appropriate range of flow rates, although, of course, a greater or lesser number could be made. Two versions of the outer cap would be produced, one with a tab in the position of tab 51 and the other with a tab in the position of tab 93 with the slots 50 appropriately configured to cause the cap to move in the desired direction with the dilution activation member 70.

The result is a device which can provide appropriate dilutions of numerous different solutions with the flow rate of water or other diluent being determined by the configuration of outer cap 18. The flow rate of solution from the bottle or other container is determined by the side of passageway 24. Although a single passageway has been shown in both the inner and outer caps, it is, of course, possible that several passageways be provided to further increase the rate of flow. Also, by providing the appropriate inner and outer cap configurations, the user cannot make incorrect dilutions. The outer cap will only fit into the housing one way and once it is in the housing the dilution activation member can only be turned one way. Since this controls the rate of flow of water or other diluent, the only other variable is the rate of flow of the concentrated solution. This is controlled by the size of passageway 24 which is determined by the supplier of concentrated solution. Thus, the use of the device of the present invention eliminates the common practice of incorrect dilutions of cleaning chemicals. It also eliminates the necessary of shipping the water contained in the diluted solutions and provides a far more economical and accurate method of supplying cleaning chemicals and other dilutions.

The present embodiments of this invention are thus to be considered in all respects as illustrative and not restrictive;

the scope of the invention being indicated by the appended claims rather than by the foregoing description. All changes which come within the meaning and range of equivalency of the claims are intended to be embraced therein.

I claim:

1. An assembly for dispensing a constant flow of liquid from a container independent of the level of liquid in the container of the type having a reservoir containing a liquid of a first height, a container outlet and a cap assembly over the container outlet, said cap assembly having an air inlet and a liquid outlet and an air pocket within the cap assembly wherein the improvement comprises:

an inner cap member adapted to be affixed to the container outlet, said inner cap member having a central axis, a bottom floor with an upper surface and a lower surface and at least one liquid passageway from the upper surface to the lower surface, said liquid passageway being surrounded by liquid outlet sealing means on said lower surface, an inner wall portion extending upwardly from said bottom floor, said inner wall portion including a cylindrical portion and said inner wall portion extending upwardly to a closed top enclosing an air chamber and said inner wall having a portion thereof with at least one sidewall opening passing from an inner surface of said inner wall to an outlet in said outer surface thereof and having sidewall outlet sealing means surrounding said at least one sidewall opening;

an outer cap member having a bottom floor with an inner surface in contact with the lower surface of said inner cap member and an outer surface and said outer cap member being turnable with respect to said inner cap member and said outer cap member having at least one opening passing from an inlet in said inner surface of said outer cap member to said outer surface of said outer cap member and said inlet having inlet sealing means abutting the outlet sealing means of the at least one opening in said inner cap member and said opening through said outer cap member being positioned so that it may be aligned with the opening in said inner cap member and also being positioned so that when the outer cap member is turned with respect to the inner cap member that said at least one opening in said inner cap member and said at least one opening in said outer cap member are not aligned and said outlet sealing means abuts said inlet sealing means and no liquid can pass through said openings and said outer cap member having a central air passageway extending upwardly past the at least one sidewall opening in said inner cap member and said central air passageway having an air exit within said air chamber and at least one air valve openable with respect to said at least one sidewall opening in said inner cap member when said at least one liquid passageway is aligned with said at least one opening through the bottom floor of said outer cap member, said at least one air valve permitting the flow of air from said air chamber into said liquid in said container whereby when said inner cap member and said outer cap member are aligned in an opening position, liquid from within said container will flow out through said at least one liquid passageway and through said at least one opening in the bottom of said outer cap member and air will replace any such liquid flowing out of said outer cap through said central air passageway past said at least one air valve, through said at least one sidewall opening into said liquid and when said inner and outer cap members are aligned so that the at least one liquid passageway and said at least one opening through said bottom floor are not aligned, no liquid will pass out of the outer cap and no liquid will enter the air chamber and whereby the liquid will flow out of the container at a constant rate as long as the liquid level is above said at least one sidewall opening.

2. The assembly for dispensing a constant flow of liquid of claim 1 wherein said at least one air valve comprises at least one groove formed along a portion of the outer surface of said central air passageway of said outer cap member and said at least one groove having sealing means adjacent an outer surface thereof and said at least one sidewall opening is surrounded by a sealing surface mateable with the sealing means adjacent said groove.

3. The assembly for dispensing a constant flow of liquid of claim 2 wherein said at least one sidewall opening comprises a plurality of sidewall openings and a matching number of grooves are formed in said outer surface of said central air passageway.

4. The assembly for dispensing a constant flow of liquid of claim 3 wherein said plurality of sidewall openings are formed in a frusto conical section of said inner wall portion of said inner cap member.

5. The assembly for dispensing a constant flow of liquid of claim 1 wherein said outer cap member is held on said inner cap member by a plurality of grooves formed in said outer cap member and a mating number of pegs are formed in an outer surface of said inner cap member and said pegs are captured by said grooves.

6. The assembly for dispensing a constant flow of liquid of claim 5 wherein said grooves have a portion thereof at a slight angle with respect to the bottom floor so that when the outer and inner caps are aligned in an open position, there is a slight space between the inner surface of the bottom floor and the lower surface of the bottom floor of the inner cap member and when the outer and inner caps are aligned in a closed position, the inner surface of the bottom floor of the outer cap is forced against the lower surface of the bottom floor of the inner cap.

7. The assembly for dispensing a constant flow of liquid of claim 1 wherein said central air passageway has a cylindrical sidewall extending upwardly from the bottom floor of the outer cap member and the inner wall portion is cylindrical and closely abuts the cylindrical sidewall of the inner cap member.

8. The assembly for dispensing a constant flow of liquid of claim 7 wherein the cylindrical sidewall of the central air passageway terminates in a frusto conical portion which, in turn, connects to an upwardly extending tube and said inner wall portion terminates in a mating frusto-Conical portion which terminates in an upper cylindrical portion surrounding said air chamber.

9. The assembly for dispensing a constant flow of liquid of claim 1 wherein the at least one opening is said outer cap member and said at least one liquid passageway in said inner cap member are rectangular in shape.

* * * * *